April 11, 1939.    M. S. JOHNSON    2,154,094
BRAKE BEAM HANGER PIN AND ADAPTER
Filed Jan. 18, 1936
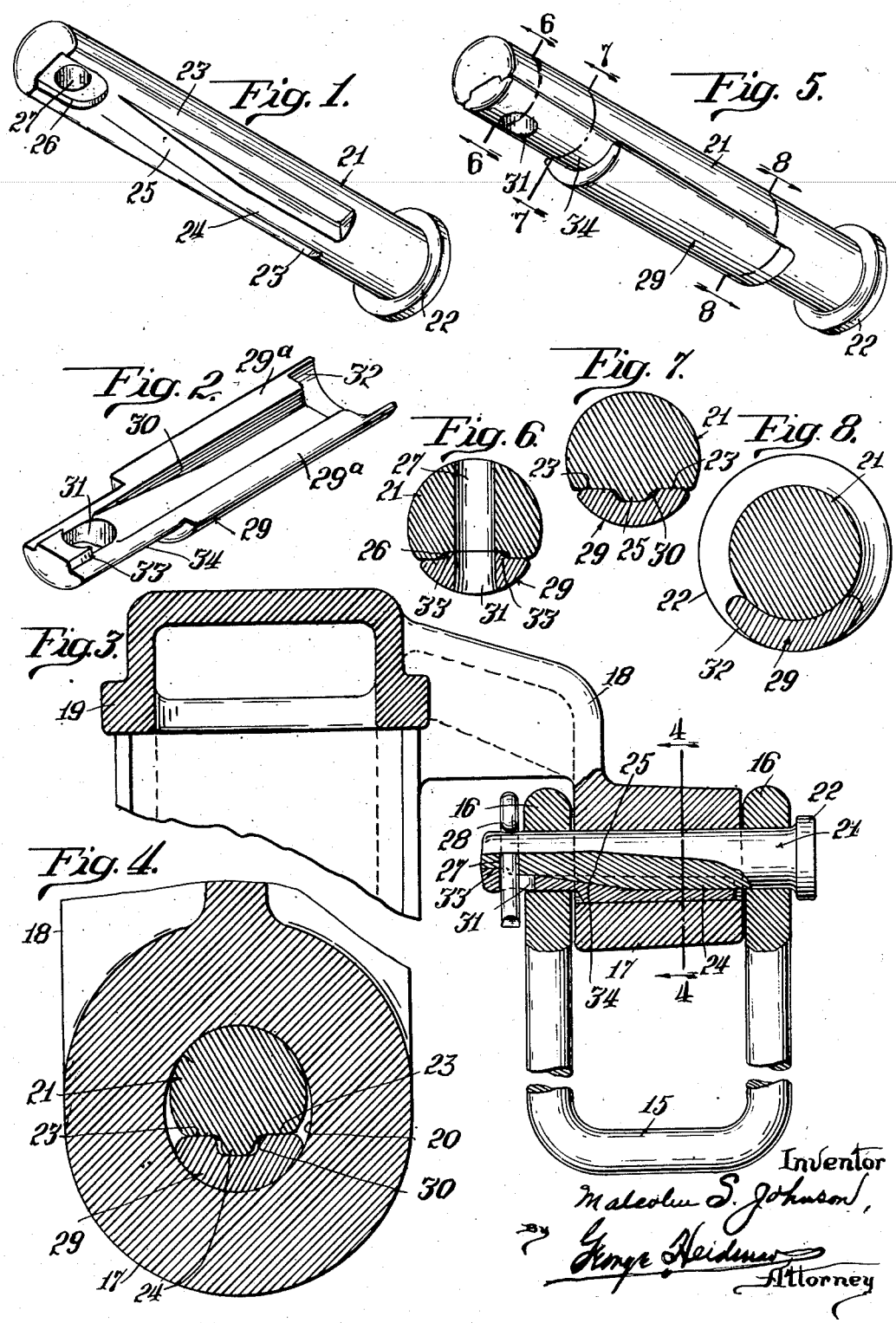
Inventor
Malcolm S. Johnson,
By George Heideman
Attorney Patented Apr. 11, 1939

2,154,094

UNITED STATES PATENT OFFICE 2,154,094

BRAKE BEAM HANGER PIN AND ADAPTER

Malcolm S. Johnson, Chicago, Ill., assignor to Illinois Railway Equipment Company, Chicago, Ill., a corporation of Illinois Application January 18, 1936, Serial No. 59,799

7 Claims. (Cl. 85—4)

My invention relates to a pin whereby the well known U-shape type of brake beam hanger is swingingly secured to the bracket formed integral with or secured to the truck frame; my improved pin and adapter being especially intended to compensate for the wear generally encountered in the pin receiving barrel or passage in what is known as a barrel type of bracket.

The hanger receiving brackets are generally an integral part of the truck frame and hence are made of cast metal; and where the ends of the brackets are provided with a cylindrical bore or passage, which is merely open at the ends, the U-type of hanger must be employed.

This type of hanger is swingingly supported on the bracket by a suitable pin adapted to pass through the eyes of the hanger and through the cylindrical barrel or bore of the bracket; one end of the pin generally being provided with an enlargement or head, while the other end is apertured to receive a cotter pin, whereby the pin is held against longitudinal movement. Due to the vibrations and oscillatory movements of the brake beams and the hangers, and because the hanger supporting pins are of harder metal than the cast metal brackets, the cylindrical bore or barrel opening through the end of the bracket soon becomes worn; the wear principally occurring in the lower arcuate surface of the bore. This causes the bore or barrel to become oblong in cross-section and allows the brake beam to drop down and hence change the position of the brakes relative to the wheels.

When this wear exceeds a predetermined degree, lowering the brake beam to an extent beyond that fixed by practice and safety, the truck must be taken out of service until this condition is rectified.

Heretofore, it has been necessary to dismantle the truck sufficiently to permit the hole or bore in the bracket arm to be filled by welding a mass of metal in the opening and then reboring or drilling a proper sized hole through the added or welded mass of metal.

The expense and time involved in this operation, as well as the loss of time in service of the car, can readily be comprehended and it is this loss that my invention eliminates, in addition to providing means which may be quickly applied without necessity for dismantling the truck and whereby varying degrees of wear in the bracket may be taken up.

The objects and advantages of my invention will all be readily comprehended from the detailed description of the accompanying drawing wherein:—

Figure 1 is a perspective view of my improved pin.

Figure 2 is a perspective view of my improved adapter plate.

Figure 3 is an enlarged vertical sectional view of a portion of a truck frame and bracket with my improved hanger supporting pin and adapter.

Figure 4 is a cross-sectional view taken on the line 4—4 of Figure 3 looking in the direction of the arrows.

Figure 5 is a perspective view of my improved hanger pin and adapter in associated relation.

Figure 6 is a cross section taken on the line 6—6 of Figure 5 as viewed by the arrows.

Figure 7 is a similar view taken on the line 7—7 of Figure 5 looking in the direction of the arrows.

Figure 8 is a cross-section taken on the line 8—8 of Figure 5 as viewed by the arrows.

My invention is especially intended for use with the well known U-shape or open ended type of hanger shown at 15, whose upper ends are eyeletted at 16. The upper eyeletted ends 16 are intended to straddle or be disposed on opposite sides or ends of the barrel portion 17 of the bracket arm 18 which is preferably made integral with the truck frame 19; the barrel portion 17 being disposed in a direction transversely of the truck frame and toward the wheels in the usual manner.

The barrel portion 17 of bracket arm 18 is originally provided with a cylindrical bore or barrel adapted to receive a cylindrical pin provided at one end with a suitable head, while the other end is apertured to receive the usual cotter-pin; the pin being of length sufficient to extend through the eyeletted ends of the hanger as well as through the bore of the barrel portion of the bracket.

As the hanger supporting pins are of harder metal than the cast metal truck frames, or the brackets secured thereto, the constant oscillatory movement of the hanger, as well as the vibration encountered, causes movement of the pin in the bracket with the result that the barrel or bore becomes worn at the bottom into oval or oblong shape in cross-section as for example shown at 20 in Figure 4.

If the wear at the bottom of the bore becomes excessive, it is apparent that the hanger moves downward and suspends the brake beam with the brake heads below the required plane or proper braking position relative to the wheel.

In view of the difficulty heretofore encountered in efforts to remedy this condition, the wear in the bracket was not taken up until the barrel became worn at least a quarter of an inch or more. As the wear occurs at the lower side of the bore causing the bore to become egg-shape in cross-section, it is evident that an over-sized pin could not be used, but rather that means must be used which could accommodate itself to the oblong opening in the bracket.

Heretofore, where the wear exceeded a predetermined degree, it became necessary to dismantle the truck frame after detaching the hanger and then to fill the bore or opening in the bracket by welding a mass of metal therein. After the mass was properly welded in place and the hole was completely filled, the welded or filled-in metal was then drilled to provide a proper sized hole adapted to receive the standard hanger supporting pin. Such operation not only requires considerable time, keeping the car out of service, but is rather expensive.

My improved means is adapted to eliminate this difficulty and expense and to provide means whereby varying degrees of wear in the hanger bracket can be taken care of without need to dismantle the truck frame.

In the specific exemplification of the invention as disclosed in the drawing where the opening 20 in the hanger is shown worn into oblong cross-section, the hanger supporting means consists of a main pin member 21, substantially circular in cross-section at one end and provided with the usual head 22 of size larger than the eye or opening in the end of the hanger 15.

At a short distance removed from the head 22, namely at point where the pin enters the barrel of the bracket (at the right hand end of the pin in Figure 3), the pin on one side is kerfed lengthwise on opposite sides of a longitudinal axis to provide two sectoral cutaway portions as shown at 23, 23, leaving a longitudinally disposed rib or wall portion 24 between the two parallelly arranged kerfs or channels 23, 23.

The rib or wall portion 24 at a point removed from the tail end of the pin gradually tapers down toward the main body as shown at 25 in Figures 1 and 3 and terminates in a socket portion 26 (see Figure 1); the socket portion 26 extending to the end of the pin and being also disposed about the hole 27 which receives the cotter-pin 28 shown in Figure 3. The cotter-pin 28 with the head 22 of the pin are disposed on the outside of the eyeletted ends of the U-hanger and hence prevent longitudinal movement of the pin.

The kerfed side of the pin is intended to receive an adapter plate 29 of arcuate formation and of length preferably slightly greater than the length of the kerfed portion of the pin. The plate on its inner or pin engaging side and along its longitudinal median line is provided with a groove or channel 30 adapted to receive the longitudinal rib 24 on the pin.

The channel 30 gradually becomes more shallow and vanishes toward the outer end of the plate to receive the tapered portion 25 of the rib 24.

The plate at the end of the groove or channel 30 is provided with a preferably elongated hole or slot 31 (see Figures 2 and 3) which is adapted to register with the cotter-pin receiving hole 27 in the main pin.

The channel 30, at the inner end of the adapter plate 29, preferably spreads outwardly toward the opposite edges and to the end of the plate thus producing the concavo-convex segmental end portion 32 (see Figure 8) which conforms with the curvature of the main pin and is intended to extend slightly beyond the kerfs or cut-away sectoral portions 23, 23 of the main pin 21. The wide longitudinal marginal portions 29ª of the adapter plate correspond with and fit into the kerfs 23, 23 of the main pin, while the rib portion 24 of the pin fits into the groove or channel 30 in the plate.

It is apparent that by flaring the end 32 of the channel 30 in the plate the wide marginal portions terminate a distance removed from the inner dished end of the plate; the marginal portions thus providing shoulders or abutments which engage the ends of the kerfs 23, 23 in the pin and prevent further sliding movement of the adapter plate toward the head of the pin.

The slotted end of the adapter plate, intermediate of the slot 31 and the immediate end and between the opposite longitudinal side edges is provided with an enlargement or lug 33 which is adapted to fit into the recess or socket 26 surrounding the cotter-pin receiving aperture 27 in the tail-end of the main pin, thereby assisting in preventing any side twist or rotational movement of the tail end of plate 29 on the pin 21.

As the wear which the adapter plate 29 is adapted to take up occurs in the lower side of the bore or barrel through the hanger bracket, and as the size of the eyelets or openings in the ends of the hanger are generally of size just sufficient to receive the supporting pin of standard diameter, the tail end of the adapter plate 29 is reduced in thickness on the outer convexed side as shown at 34, see Figures 2 and 5. In other words, the reduced end of the adapter plate constitutes a segmental portion of the pin, with the combined thickness of the plate and tail end of the pin approximating the diameter of a standard hanger supporting pin as disclosed, for example, at the head end of the pin.

It is apparent that the main or thick portion of the adapter will fill in or take up the wear in the barrel or bore of the bracket as more clearly shown in the cross-sectional view Figure 4, causing the pin to be held toward the upper part of the bore and hence maintain the hanger and the brake-beam at the original and required elevation whereby proper brake application may be provided.

The aperture 31 in the adapter plate is preferably elongated in a direction lengthwise of the plate so that slight longitudinal adjusting movement of the adapter on the pin may be possible without inducing a shearing action on the cotter-pin; the lug 33 at the end of the adapter plate and the socket at the tail end of the main pin prevent twist or lateral movement of the plate at the end of the pin.

As is apparent, adapter plates of different thicknesses may be employed to take up varying degrees of water at the bottom or lower side of the barrel or bore in the bracket arm.

Where the barrel or bore in a bracket arm has become improperly worn, the original supporting pin is removed and the eyes of the hanger moved out of register with the bore in the bracket. My improved adapter plate 29 is then inserted into the bore of the bracket with the enlarged convexed side of the plate resting in the cupped or worn bottom of the bore and the reduced end of the adapter plate permitted to protrude from the bore. The sides of the hanger are slightly sprung to permit one eye of the hanger to receive the reduced end 34 of the adapter; the hanger then being forced or allowed to spring back to normal condition so as to bring the other eye of the hanger into register with the opposite end of the bore in the bracket. My improved pin 21 is then inserted through said opposite end or eye of the hanger and through the bore in the bracket arm; the pin being inserted with the kerfed side of the pin facing downwardly so as to ride along the upper grooved face of the plate; the pin being driven in until its tail end extends through the other end or eye of the hanger into which the apertured end of the adapter plate was previously inserted as above stated, the aperture 27 in the pin being made to register with the slot 31 in the plate, at which time the cotter-pin 28 is then inserted through these registering openings as shown in Figure 3; the pin and adapter plate combinedly filling the bore or barrel in the bracket arm as shown in Figure 4.

The structure as disclosed and herein described is believed to be the best embodiment of my invention although modifications are possible and may be made without, however, departing from the spirit of my invention as defined in the appended claims.

What I claim is:—

1. A brake beam hanger pin and adapter comprising an elongated pin member provided at one end with a head while the opposite or tail end is provided with a transverse aperture, the pin on one side being provided with a pair of elongated sockets or cut away portions arranged in parallel spaced relation lengthwise of the pin and terminating on opposite sides of said aperture so as to provide a rib therebetween extending lengthwise and tapering toward the tail end of the pin and terminating forward of said aperture; and an adapter plate provided with an arcuate outer face while the opposite longitudinal face is grooved to receive the rib on the pin member while the longitudinal faces of the plate on opposite sides of said groove match the sockets in the pin and terminate short of one end of the adapter plate and provide transverse shoulders adapted to engage the ends of the sockets, said adapter plate being adapted to slide lengthwise of the pin, one end of the adapter having an aperture arranged to register with the aperture in the tail end of the pin; the pin and adapter plate having correlated engaging faces.

2. A brake beam hanger pin and adapter comprising a main pin provided at a distance removed from the head end thereof with cut away sectoral portions extending lengthwise in spaced relation, said cut-away portions terminating in a flat face portion at the tail end of the pin, the side of the pin intermediate of said cut-away portions being beveled toward the flat face portion, the tail end of the pin being provided with an aperture; and an arcuate adapter plate provided with a flat face grooved lengthwise with the bottom of the groove sloping toward one end to correspond with the beveled portion of the pin, the longitudinal portions of the plate on opposite sides of the groove being adapted to seat in the cut-away sectoral portions of the pin, the plate at one end being transversely reduced and having an aperture adapted to register with the aperture in the pin.

3. A brake beam hanger pin and adapter comprising a main pin provided with a head at one end, one longitudinal side of the pin being provided with a pair of parallelly arranged grooves extending lengthwise from a point removed from the head to the opposite or tail end of the pin, the tail end being provided with an opening extending transversely through the pin; and an adapter plate of arcuate formation in cross-section, with the inner side provided with a pair of spaced apart longitudinally disposed portions adapted to seat in said grooves, one end of the plate being of thickness less than the remainder of the plate and having an opening therethrough adapted to register with the opening in the tail end of the pin.

4. A brake beam hanger pin and adapter comprising a cylindrical main pin of preselected length and thickness and having a head at one end while the other or tail end of the pin is reduced and provided with a socket and apertured transversely, the side of the pin intermediate of the socket and the head having a pair of spaced apart grooves extending longitudinally; and an adapter plate adapted to extend throughout the length of the cut-away portion, with one end reduced to constitute a segmental portion at the reduced tail end of the pin and said portion provided with a lug and an opening adapted to register with the socket and with the aperture in the pin; the inner face of the plate being formed to match the grooved side of the pin whereby sidewise movement between the pin and plate is prevented.

5. A brake beam hanger supporting device of the character described comprising a main pin provided with a head at one end and a cotter-pin receiving aperture at the other end, one side of the pin being cut away lengthwise of the pin; and a segmental plate having a face adapted to match the cut-away portion of the pin, the plate at one end being reduced in thickness and thereby providing an abutting shoulder; the pin and plate being provided with cooperating surfaces whereby movement of the plate on the pin is prevented.

6. A brake beam hanger supporting device of the character described comprising a main pin provided with a head at one end while the opposite end is apertured and provided with a socket disposed about the aperture, the side of the pin provided with the socket being cut away lengthwise toward the apertured end of the pin and said cut-away side provided with a longitudinal rib tapering at one end toward and terminating at said socket; and an elongated segmental plate coextensive with the cut-away portion of the pin and adapted to substantially match said cut away portion, the plate being provided with a longitudinal groove diminishing in depth toward one end and adapted to receive the rib on the pin, the plate being provided with an aperture adapted to register with the aperture in the pin and provided with a lug adapted to enter the socket at the apertured end of the pin; the plate and pin at the opposite end of the plate being formed to prevent longitudinal movement of the plate toward the head of the pin.

7. A device of the character described comprising a main pin provided with a head at one end, one longitudinal side being cut away at a distance removed from the head to the tail end of the pin; and a segmental plate adapted to match the cut away portion of the pin, said plate at a distance removed from the tail end being radially enlarged to provide abutting shoulders on the composite pin at prearranged distances from the head and tail ends thereof; the ends of the pin and of the plate being apertured to receive a cotter-pin.

MALCOLM S. JOHNSON.